Jan. 8, 1929.  L. A. CHAPLEAU  1,698,151
FISHING LURE
Filed May 3, 1928
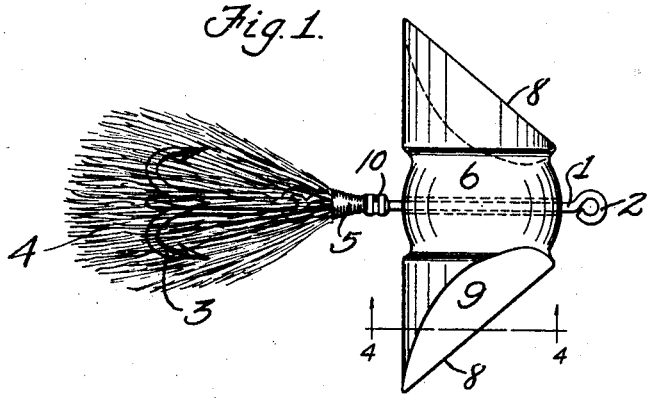
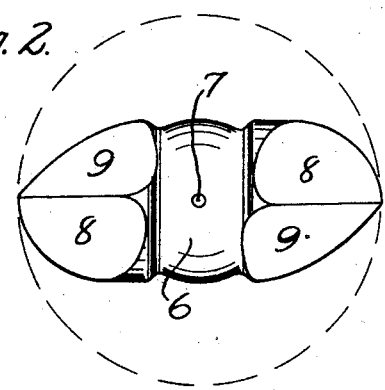
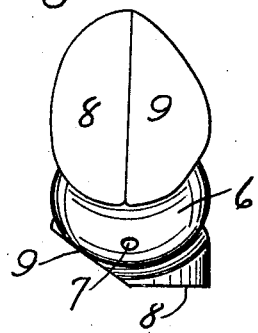
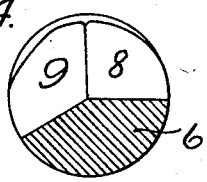
INVENTOR.
Louis A. Chapleau.
BY
ATTORNEY.

Patented Jan. 8, 1929.

1,698,151

UNITED STATES PATENT OFFICE.

LOUIS A. CHAPLEAU, OF SOUTH BEND, INDIANA, ASSIGNOR TO SOUTH BEND BAIT COMPANY, OF SOUTH BEND, INDIANA.

FISHING LURE.

Application filed May 3, 1928. Serial No. 274,853.

The invention relates to fishing lures or baits, particularly of the type commonly known as the plug type, and has for its object to provide a device of this character which is rotatably mounted on a draw shaft, the axis of rotation thereof being transverse to the longitudinal axis of, and direction of movement of, the bait.

A further object is to provide a device of this character in which the ends carry deflecting faces which cause the bait to rotate end for end in a direction transverse to the direction in which it is drawn through the water.

A further object is to provide a device of this character which will float upon the surface, and which will greatly agitate the water as it is drawn therethrough.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a plan view of the bait.

Figure 2 is a front view of the bait body.

Figure 3 is a perspective view of the bait body.

Figure 4 is a sectional view of the bait body taken on line 4—4 of Figure 1.

Referring to the drawing, which shows the preferred embodiment of my invention, the numeral 1 designates a draw shaft having an eyelet 2 at the end thereof to which a fishing line may be secured. At the other end of the draw shaft 1 is secured the hook or set of hooks 3, which is more or less hidden by the hackle 4 secured to the draw shaft 1 by means of the thread winding 5, as in the manner well understood in the art. The beading 10 carried by the shaft 1 forms a bearing against which the bait body 6 may rotate.

On the shaft 1 is rotatably mounted the bait body 6, which shaft extends through a bore 7 in the body 6, which bore is disposed transversely with respect to the longitudinal axis of the body, so that the bait body turns end for end as it rotates on the shaft 1. The bait body 6 is of the type commonly known in the art as plug type baits, and is made of wood or some other buoyant substance, although I do not limit myself to the use of buoyant material. The body 6 is preferably cylindrical in shape and has its ends 8 formed angularly with respect to the transverse and longitudinal axes of the body, and converging inwardly to the front of the body as it is mounted upon the shaft 1, thus making it of a form substantially V-shaped in longitudinal cross section. Deflecting faces 9, angularly formed with respect to faces 8, as shown in Figure 3, are carried at each end of the body, each being on a side opposite to the other so that the resistance of the water against the deflecting faces as the bait is drawn through the water will cause the bait to rotate. The faces 8 and 9 of the bait body are so formed that if the body was cut on a plane parallel to the longitudinal axis thereof and perpendicular to the bore 7, the sides 8 of the plane so cut would be parallel as would also be the sides 9 thereof.

In use the bait will float upon the surface of the water when idle, and when drawn through the water the resistance of the water against the deflecting faces will cause the bait body to rotate and consequently to agitate the water as it rotates.

Thus it will be seen from the above that a bait body is provided which is rotatably mounted on a draw shaft in such a manner that it rotates bodily end for end; said rotation being caused by the resistance of water against deflecting faces at each end of the bait body as the body is drawn through the water. The agitation and spraying of water forwardly of the bait, caused by the rotation thereof, is such as to attract the notice of fish at a considerable distance, and consequently the bait is very efficient for its purpose.

The invention having been set forth, what is claimed as new and useful is:

1. A fishing lure comprising a plug type body having angular deflecting faces at its ends, and a draw shaft rotatably mounting said body transversely of its longitudinal axis.

2. A fishing lure comprising a plug type body having angular deflecting faces at its ends, a draw shaft rotatably mounting said body transversely of its longitudinal axis, and a hook carried by said shaft.

3. A fishing lure comprising a draw shaft, and a plug type body rotatably transversely mounted on said shaft on the transverse axis thereof, the ends of said body being angularly shaped with respect to its longitudinal axis.

4. A fishing lure comprising a draw shaft, a hook carried by said shaft, and a buoyant body of the plug type rotatably mounted on said shaft on a transverse axis thereof whereby said body may rotate end for end.

5. A fishing lure comprising a shaft, a hook carried by said shaft, and a body member of the plug type rotatably mounted on said shaft on a transverse axis thereof, said body being cylindrical in shape with two faces formed on each end, said faces being formed angularly with respect to the longitudinal axis of the body and with respect to each other.

6. A fishing lure comprising a body of the plug type, a draw shaft mounting said body on a transverse axis thereof, and deflecting means carried by the body whereby the body will be rotated end for end when drawn through the water.

7. A fishing lure comprising a draw shaft, and a plug type body rotatably mounted on said shaft and rotating on a transverse axis thereof, the ends of said body being formed on outwardly and backwardly inclined planes forming deflecting faces.

8. A fishing lure comprising a body member of the plug type, and a draw shaft rotatably mounting said body member, said body member rotating end for end in a plane angular to the draft line of the lure.

9. A fishing lure comprising a shaft, and a body of the plug type rotatably carried thereby, said body rotating on an axis angular to the longitudinal axis thereof.

10. A fishing lure comprising a draw shaft, a body member of the plug type mounted on said shaft and rotatable on an axis transverse of the body, inwardly and forwardly converging faces formed at the ends of said body, and deflecting faces formed at the ends of said body, said deflecting faces being angularly disposed with respect to said first named faces.

In testimony whereof I affix my signature.

LOUIS A. CHAPLEAU.